United States Patent

[11] 3,627,225

[72] Inventors Paul J. Badum
Boulder, Colo.;
Henry Zeiger, New Caanan, Conn.
[21] Appl. No. 59,668
[22] Filed July 30, 1970
[45] Patented Dec. 14, 1971
[73] Assignee International Business Machines Corporation
Armonk, N.Y.
Continuation-in-part of application Ser. No. 790,709, Nov. 13, 1969, now abandoned. This application July 30, 1970, Ser. No. 59,668

[54] RECORD MEMBER CONTAINER
13 Claims, 6 Drawing Figs.

[52] U.S. Cl. .......... 242/182, 226/118, 242/197
[51] Int. Cl. .......... G11b15/58, G11b 23/10
[50] Field of Search .......... 242/182, 183, 184, 185, 197, 198, 199, 200, 71.1, 71.2, 55, 67.1 DB; 206/52; 179/100.2 Z, 100.2 P; 226/118, 95, 97, 45, 50, 51; 352/72, 78

[56] References Cited
UNITED STATES PATENTS

| | | | |
|---|---|---|---|
| 2,995,313 | 8/1961 | Namenyi-Katz .......... | 242/182 X |
| 3,342,431 | 9/1967 | Mouissie .......... | 242/197 |
| 3,458,156 | 7/1969 | Davies et al. .......... | 242/182 |

*Primary Examiner*—George F. Mautz
*Attorneys*—Hanifin & Jancin and Herbert F. Somermeyer ABSTRACT: A container for a record member of the flexible web type which includes a box having one wall hinged to provide an openable cover. A single reel may be journaled for free rotation on an axis parallel to the plane of the cover wall. The record member is wound on the reel with its inner end firmly secured to the reel and its outer end firmly secured to the cover at a point spaced from the hinged edge of the cover. Other means of web retention may be used. Drive connection means for the reel are provided through the container to permit the record member to be reeled or unreeled as required while the ends remain secured. The invention also includes the combination of the container with a record handling system having a processing chamber into which the portion of the member intermediate its ends may be inserted.

INVENTORS

PAUL J BADUM

HENRY ZEIGER

BY

ATTORNEY

RECORD MEMBER CONTAINER

RELATED APPLICATIONS

This application is a continuation-in-part of application Ser. No. 790,709, filed Jan. 13, 1969, now abandoned.

Another related application is Ser. No. 790,710, filed Jan. 13, 1969.

The present invention relates to containers for flexible web record members and, more particularly, to a container usable with an automatic record handling apparatus.

U.S. Pat. application Ser. No. 790,710, by P. J. Badum and V. Nejezchleb, assigned to the assignee hereof, discloses a record processing system in which a flexible web recording member of predetermined length is bodily inserted in a processing chamber and translated past a transducer to record and play back information stored on the record member. In that system, which is described generally later herein, it is contemplated that the record member be lodged in a container that can be presented to the processing system and opened so that the record member can be extracted and loaded into the chamber. It is the principal purpose of this invention to provide a record member holding container that can be used with such a processing system or with other apparatus.

More specifically, it is an object of this invention to provide a compact and easily handleable storage container which holds a predetermined length of flexible web record member in a fashion that allows the entire useful length of the member to be withdrawn from the container while still permanently attached thereto.

Another object of the invention is to provide a record member holding container having a single reel of flexible web recording media which is automatically partially withdrawn upon opening the container and which can be readily returned to the container by operating driving means on the container and coupled to the reel.

This invention also contemplates the combination of the disclosed container with a processing apparatus having means to hold the container and to accept the record member contained therein for processing while its ends remain fixed to the container.

The container provided by this invention offers a compact and easily handled unit that can be stored, moved, and handled for processing by automatic means. It completely encloses the contained record member and protects it against damage or contamination from dust and other elements. It also enjoys the advantages of simplicity and ease of manufacture.

The foregoing and other objects, features, and advantages of the invention will be apparent from the following more particular description of preferred embodiments of the invention, as illustrated in the accompanying drawings.

THE CONTAINER

Figure 1:
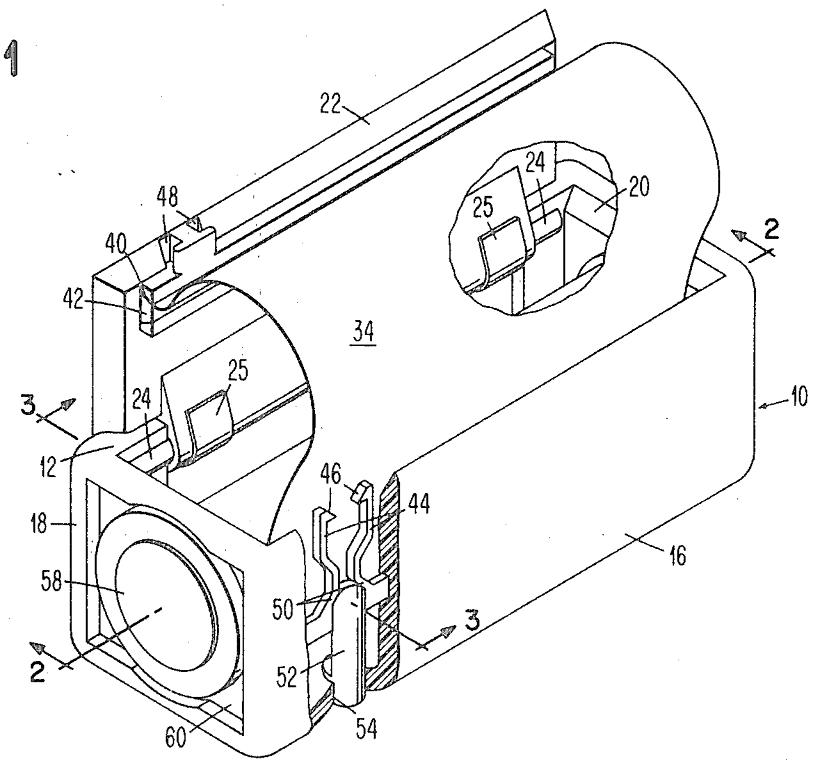
FIG. 1 is a perspective illustration of a container embodying the present invention.
Figure 2:
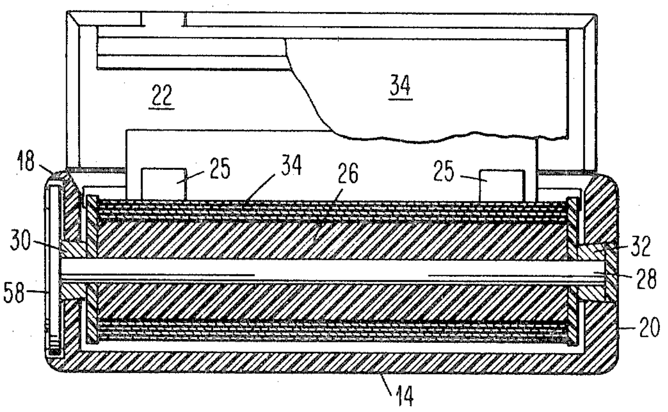
FIG. 2 is a longitudinal sectional view of the container taken substantially along the lines 2—2 of FIG. 1.

Referring now to the drawings, FIG. 1 shows a container 10 embodying the present invention. The container comprises a hollow box of rectangular shape having a width slightly greater than the width of the record member it stores, and a generally square cross section large enough to accommodate the rolled record member. Three of the sidewalls 12, 14, and 16 are permanently joined together and to the end walls 18 and 20 to form an open box. The fourth sidewall 22 is hinged to the wall 12 to form an openable cover. In the embodiment of FIG. 1, the several parts 12–20 are molded into an integral structure, though they may be formed separately and bonded at their meeting edges. The box and cover member 22 are preferably formed of a high impact strength plastic material, such as polypropylene.

Figure 3:
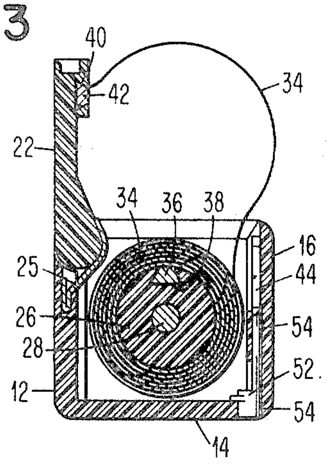
FIG. 3 is a transverse sectional view taken along the lines 3—3 of FIG. 1.

The cover member 22 is hinged by simple pin hinges 24 to the wall 12 so that it can open about 90°, or so, to give unrestricted access to the interior of the container 10. Hinge springs 25 are provided to urge the cover into the open position. Within the container, a reel 26 is provided. In the embodiment of FIG. 1, the reel 26 is fixed upon a shaft 28 that is journaled for free rotation in bearings 30 and 32, mounted in the end walls 18 and 20 of the container. The reel 26 holds a predetermined length of a flexible record member 34. The member 34 may be of any suitable type to accommodate the storage function it serves, including, for example, photographic film, punched paper tape, etc. In this embodiment, it takes the form of a flexible magnetic tape, including a polyester substrate with a magnetizable coating thereon. As shown in FIG. 3, one end of the member 34 is securely fastened to the reel 26 by a clamping wedge 36 that fits into a wedge-shaped slot 38 in the reel surface. The end of the record member to be clamped is inserted in the slot so that it is crimped beneath the wedge 36. The opposite end of the record member is fastened in like manner to the inner surface of the cover 22 along a line parallel to, but spaced from, the hinge 24. The slot and wedge which perform the connection are shown at 40 and 42, respectively.

The portion of the record member 34 intermediate the fastened end portions is wound on the reel 26 by rotating the reel. The winding direction is preferably clockwise as viewed in FIG. 3. It will be observed that when the reel is fully wound, it will draw the end of the member 34 fastened to the cover inwardly and swing the cover 22 against the hinge spring face into closed position. A latch mechanism in the wall 16 retains the cover closed. This mechanism may be of any suitable type; a satisfactory arrangement includes a pair of spring fingers 44 anchored in the wall 16 and having opposed prongs 46 which engage reentrant recesses 48 in the cover 22 to retain it. The prongs 46 have sloped upper surfaces which force them apart when the cover engages them to admit them to the recesses 48. Latching action on closing the cover is thus made automatic. Additional sloped shank portions 50 on the fingers 44 provide means for forcing them apart to release the cover. A pin 52, slidably received in an aperture 54 in the wall 16, engages the shank portion 50. When the pin 52 is pressed inwardly, it forces the fingers 44 apart to disengage the prongs 46 from the cover recesses and unlatches the cover. The spring action of the fingers returns the pin 52 to its normal position when unlatching pressure is released.

An important feature of this invention resides in the connection of the record member 34 to the cover 22. When the cover springs open under influence of the springs 25, it pulls the record member with it and creates a small loop which may be acted upon by a record handling apparatus with which the container 10 is associated. The apparatus may then operate to enlarge the loop and withdraw the entire record member 34, leaving only its ends connected by the clamping arrangements on the cover and reel.

Return of the member to the container is accomplished by rotating the reel 26 to rewind the member 34 and pull the cover closed. A clutch member 58 fixed on the shaft 28 outside of the end wall 20 provides a driving interface for this purpose. As seen in FIG. 1, the clutch member 58 is set into a recess 60 in the wall 16 to preserve a smooth outline for the container for handling.

While the illustrated container has a spool journaled to the end walls 18 and 20, the present invention is easily practiced using other known arrangements. For example, the spool-container combination may be a so-called bearingless arrangement. That is, the spool is freed for rotation by means external (not shown) to the container. In one instance, the container may be placed on end wall 18. A cone clutch could engage member 58, lifting spool 26 free of box 10, thereby permitting rotation. In another instance, spool 26 has axially movable flanges which are engaged and pushed together a short distance freeing both flanges from box 10, thereby being freed for rotation. Both of the latter instances are known techniques which may be used in the successful practice of this invention.

Some record processing systems have used endless loops or closed belts of record media. In such systems, the media is stored in compartments in tight convolutions. Such an arrangement requires more volume than a spool as above described but also eliminates one part—the spool. Performance-volume tradeoffs must also be considered. Media storage using convolutions may also be used in practicing this invention to accomplish the first-mentioned object. In such a situation, one end portion of media 34 is secured to cover 22 as first described. The opposite end would be either secured to box 10 or lid 22. When practicing this invention with a convolution storage technique, it requires a larger box 10 of the same length of media 34 and further requires controlling loading media 34 to ensure proper formation of convolutions without creasing. Such techniques are outside the scope of the present invention and are not described for that reason.

A RECORD PROCESSING SYSTEM

Figures 4, 6:
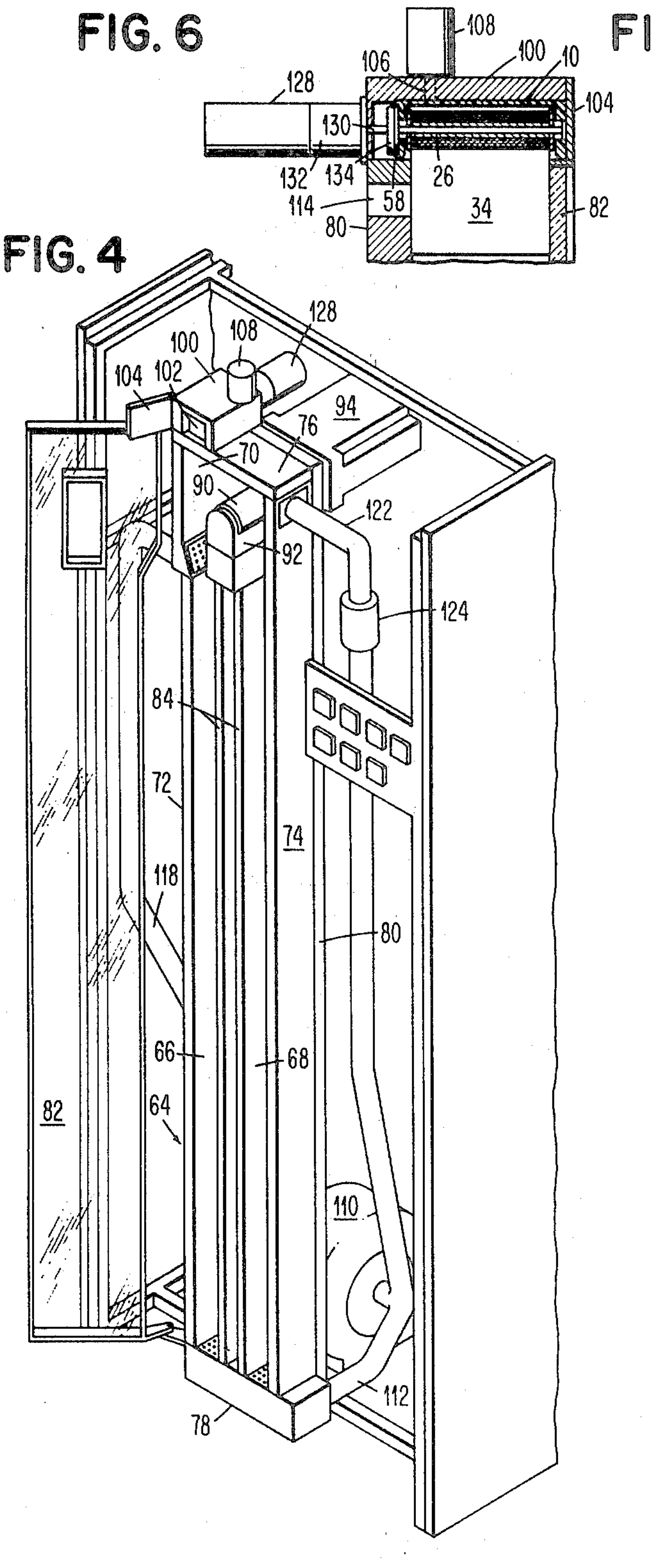
FIG. 4 is a perspective illustration of a record processing apparatus with which this invention may be used, showing the container in operative position to have its record member extracted and inserted into the processing apparatus.
FIG. 6 is an enlarged sectional view taken substantially along the lines 6—6 of FIG. 5.
Figure 5:
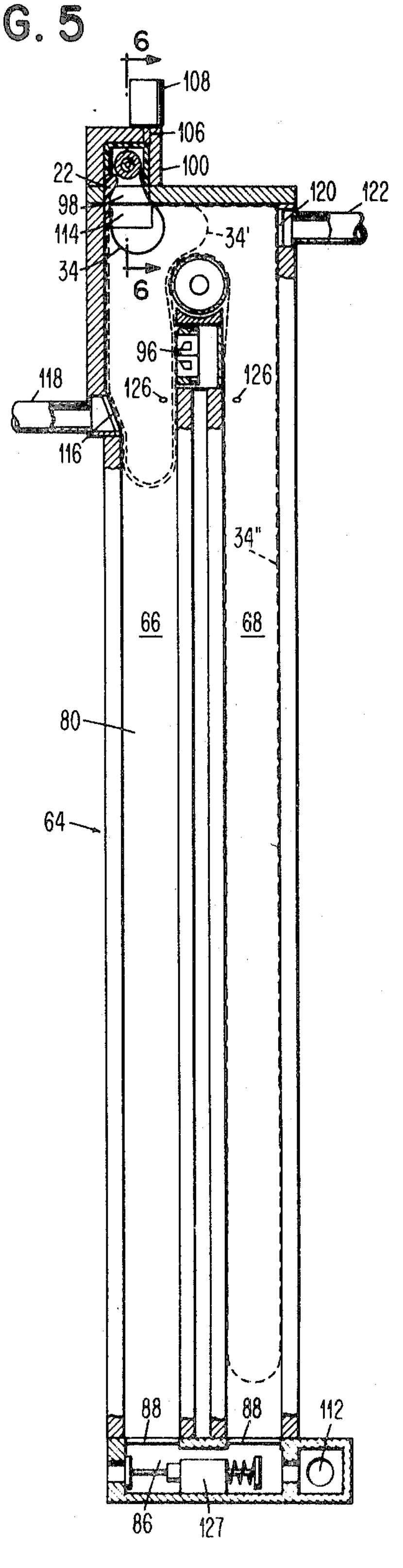
FIG. 5 is an enlarged partial elevational view showing the loading of a record member.

This invention includes the use of the container just described, with a data-handling system having means to withdraw, process, and return the record member to its container. A data storage system particularly well adapted for handling record members stored in containers embodying this invention is shown in FIGS. 4, 5, and 6. This system is described in detail in the copending application Ser. No. 790,710, mentioned earlier herein.

The system includes a housing unit generally indicated by the reference numeral 62, which supports a processing chamber 64. The chamber 64 is in the form of an inverted U, having two separate vertical columnar portions 66 and 68 which communicate at the top with a plenum area 70. The several portions 66, 68, and 70 are enclosed by walls including sidewalls 72 and 74, top and bottom walls 76 and 78, a rear wall 80 and a front wall 82. The front wall 82 is in the form of a door which may be opened to provide access to the processing chamber. The two columnar chamber portions 66 and 68 are divided by a partition arrangement indicated at 84. This portion terminates short of the bottom wall 78 to provide a vacuum plenum 86 common to both columns 66 and 68 (see FIG. 5). Screens or apertured plates 88 separate the plenum 86 from the two columns. During operation of the device, a partial vacuum is maintained in the plenum 86 for a purpose which will become apparent later herein.

At the upper end of the partition 84, a drive capstan 90 is positioned. The capstan 90 is cylindrical in shape and extends substantially the full depth of the chamber 14 from the front wall 82 to the rear wall 80. The capstan 90 is mounted on a framework 92 that rests on the top of the partition 84. This framework extends through the rear wall 80 of the housing and also carries a motor 94 that drives the capstan. The capstan diameter is at least equal to and preferably slightly greater than the distance between the two columns 66 and 68. Below the capstan, a transducer assembly 96 is mounted in the partition 84 so that its operating surface is exposed to the column portion 66. The operating surface of the transducer 96 is positioned substantially flush with the side wall surface of the column 66.

The processing chamber just described is adapted to receive the record member or tape 34. The top wall 76 has therein an opening 98, preferably located at the left end, through which the tape may be admitted to the chamber. The tape itself is, of course, contained in the container 10 that may be bodily moved into operative position over the opening 98 to present the tape for processing.

Depending upon the method of handling containers, any of several mechanisms may be provided adjacent the opening 98 to position the container 10. In the apparatus shown, the container is manually positioned, though automatic positioning mechanisms can be visualized. A cagelike framework 100 is mounted above the opening 98 for supporting a container in operative position. The framework 100 has an opening 102 at the front, through which the container 10 may be manually inserted, and a hinged closure plate 104 that is used to secure it against movement when it is in place. The container is inserted into framework 100 with its cover 22 facing downwardly over the opening 98. Cover unlatching means, including a plunger 106 and an operating solenoid 108 therefor, are mounted on the framework 100. Upon energization of the solenoid 108, plunger 106 is driven downwardly through an opening in the upper wall of framework 100 to operate the latch pin 52 and unlatch the cover 22. Under influence of its springs 25, the cover swings rapidly down through opening 98 to its open position and comes to rest against sidewall 72 of the processing chamber. As earlier described, the opening movement of the cover pulls a small amount of tape from the reel 26 into the chamber. The inertia of the reel will cause it to continue rotation briefly after the cover movement has ceased and will feed additional tape into the chamber to produce a small loop, as shown at 34 in FIG. 5.

At about the same time that the cover is opened, vacuum is applied to the plenum 86 from a vacuum pump 110 connected to the plenum by conduit 112, to reduce the pressure within the columns and the area 70. Since the width of the tape 34 is essentially equal to that of the interior portions of the chamber, the tape will effectively seal the chamber from the opening 98 and a pressure differential will be created that will force the loop of tape down into the processing chamber, continuing rotation of reel 26 and withdrawing the tape therefrom. To ensure this action, an additional opening 114 is formed in the rear wall 80 adjacent the opening 98 to maintain atmospheric pressure above the tape loop.

The dashed lines 34′ and 34″ in FIG. 5 illustrate the progress of the loading operation under influence of the vacuum in plenum 86. Column 66 is made wider at the top than column 68 and, since the force acting to draw the tape into the two columns is proportional to the cross-sectional areas of the columns, greater initial force is asserted in column 66 than in column 68, until the tape loop fills the widened area, as shown by the dashed line 34′. Once that position is reached, the tape will tend to dump into column 68, since very little frictional force is present in this column due to the feeding of the tape web from the right side. A vacuum port 116, positioned in sidewall 72 at the point of widening, clamps the flight of tape leading from the cover 22 firmly to wall 72 and holds it in place during subsequent rotations. Port 116 is coupled via conduit 118 to the vacuum plenum 86 so that vacuum pressure is available at port 116 at all times during the loading operation. Dashed line 34″ shows the position of the tape when fully stripped from reel 26.

It will be appreciated that other arrangements than vacuum may be provided to load the member 34 from the container into the processing area. For example, the member may be forced into the area 86 by application of pressure to the container, or the reel 26 may be driven to spill the member 34 out.

Once the tape 34 has been inserted as just described, the portion thereof extending from the empty reel into the chamber 70 is pinned firmly to the upper right corner of the chamber. This is accomplished by applying vacuum to a port 120 located at the top of sidewall 74. The vacuum at this port 120 draws the tape into the corner and holds it firmly in place throughout subsequent processing. The vacuum is applied via conduit 122 from a valve 124 connected to the common vacuum source for the device. Valve 124 is preferably operated in timed sequence after opening of the container, or it may be operated in response to a sensor (not shown) which indicates that the entire length of tape has been stripped from reel 26.

When the tape has been loaded and secured as just described, it may be processed by passing it over the transducer 96. This is accomplished by transferring the portion of tape initially stored in column 68 back and forth between the two columns. Driving force is, of course, transmitted from capstan 90.

It will be appreciated that somewhat less than the whole length of tape 34 can be guided in transducing relation past the transducer 96. To maintain control of the tape during processing, it is necessary to maintain a wrap about capstan 90, so the transfer of tape from column 68 to column 66 must terminate while a short loop of tape remains in column 68. Similarly, transfer of tape from column 66 to column 68 must terminate while a loop remains in column 66 and before the loop has moved above the transducer 90. The limits for movement of the tape are established by markers (not shown), applied to the tape.

End-of-tape sensors 126, which may be of any known kind, are provided in the columns to detect the presence of the markers when the loop in either column has risen to the maximum allowable height, and stop further transfer of tape into the other chamber.

The signals from sensors are supplied to the control circuitry (not shown) for the driving motor 94 coupled to capstan 90. In accordance with known technology, the capstan may be driven by direct connection to a reversible motor or through intermediate clutching and braking means. Its motion control apparatus, whatever form it takes, will be responsive to the signals from the two sensors to stop the tape, or stop and reverse, depending upon commands from the utilization device under whose control the tape 34 is being processed. The present invention is not concerned with the details of this processing activity and they will not be described herein. Techniques of controlling tape transports for efficient processing of information re well developed and well within the skill of the art.

When the tape 34 has been processed and is ready for removal from the processing unit, it is simply rerolled onto the reel 26 and the container 10 is removed. Prior to rerolling, the vacuum pump which supplies vacuum pressure to plenum 86 and ports 116 and 120 is shut down or valved off from these elements and atmospheric pressure is admitted to the plenum and ports to relieve the pressure differential across the tape loops. The valve 127 shown in FIG. 5 performs this function. The capstan 90 is also stopped at this time, of course. A rewind motor 128 (see FIG. 6), mounted at the top of the processing chamber adjacent the cage 100, is employed to perform the rewind operation. The motor 128 includes reel-engaging means that is capable of moving axially of the reel 26 to drivingly engage it and rotate it in a direction to rewind the tape 34. While several arrangements for performing this engagement can be visualized, the arrangement shown includes an axially extendable shaft 130, driven by the motor 128 and actuated in the axial direction by a solenoid 132. A clutch disk 134 on the shaft frictionally engages the clutch member 58 connected to the shaft of reel 26.

As mentioned, since one end of the tape is coupled to the cover 22, completion of the rewind operation will pull the cover 22 into its closed position. Once the cover is closed, the motor 128 may be deactivated and the container removed by hand or mechanically.

It will be appreciated that the container described herein can be used with systems that depart substantially from that shown in FIGS. 4 through 6, and that the description of that using system herein is not intended to limit this invention, but rather to illustrate an exemplary application. An aspect of the invention is the combination of the container with a processing apparatus having means to support the container and a processing area adjacent the supporting means into which the record member may be inserted for processing. The apparatus will also include means for drawing the record member out of the container for processing and means to reroll it onto the reel 26. Other processing units than the specific one shown in FIGS. 4 through 6 can be visualized, however. One modification might include, for example, means for withdrawing the member 34 from the reel 26 during processing thereof in one direction and returning it during processing in the opposite direction rather than wholly removing the member during loading, as in the embodiment of FIGS. 4 and 5.

The container provided by this invention may be modified in several ways to meet specific requirements without departing from the spirit of the invention. For example, instead of journaling the reel 26 in bearings such as 30 and 32, the reel may be loosely received in the container without rotatable support, and arranged to be picked up for rotation by spindles inserted through apertures in the end walls of the container. The spindles would, of course, be a part of the handling apparatus. Rotational driving force for rewinding would be applied, in such a case, by driving one of the spindles.

The mode of attaching or securing the ends of record member or media to the box at its cover and another place inside the box is considered a design choice. For example, an end portion of a record member may be looped about the reel hub with a pin or other stop engaging the record member end portion for rotation with the reel. Adhesive securing may also be used. Releasably securing the cover in a closed position may also be accomplished in several ways. From these comments, it should be apparent many design choices and variations may be used in the successful practice of the present invention.

While the invention has been particularly shown and described with reference to preferred embodiments thereof, it will be understood by those skilled in the art that various changes in form and details may be made therein without departing from the spirit and scope of the invention.

What is claimed is:

1. A flexible record member holding container for use with a record member processing apparatus comprising:

a. a box member having an openable cover movably secured thereto;

b. a reel positioned within the box member adapted for free rotational movement with respect thereto; and c. an elongated flexible record member having one end thereof secured to the reel and the opposite end thereof secured to the cover of the box member, the portion of the member between said ends being rollable onto the reel and being adapted to be removed substantially in its entirety from the box member while the ends remain secured to the reel and the cover, respectively.

2. The apparatus of claim 1 wherein the cover is hinged to the box member along an edge thereof parallel to the rotational axis of the reel, and wherein the end of the record member secured to the cover member is secured along a line parallel to the hinged edge, but spaced therefrom.

3. The apparatus of claim 1 wherein the reel is fixed to the box member for rotational movement about its axis with respect to the box member.

4. The apparatus of claim 2 wherein the reel is fixed to the box member for rotational movement about its axis with respect to the box member.

5. The apparatus of claim 2 including means connected to the reel for coupling the reel to a driving element outside the box member.

6. The apparatus of claim 5 wherein the means for coupling the reel to a driving element includes a shaft connected to the reel and extending through the box member, and a clutch member on said shaft outside the box member.

7. An information processing system for handling flexible web record members of predetermined length, comprising:

a. a box member having an openable cover secured thereto;

b. a reel positioned within the box member adapted for free rotational movement with respect thereto;

c. an elongated flexible record member having one end thereof secured to the reel and the opposite end thereof secured to the cover of the box member, the portion of the member between said ends being rollable onto the reel and being adapted to be removed in its entirety from the box member while the ends remain secured to the reel within the box member and the cover;

d. a processing apparatus including a processing area adapted to receive the record member;

e. means for supporting the container adjacent the processing area with its cover facing toward the area;

f. means for opening the cover on the container to introduce the portion of the record member fastened thereto to the processing area;

g. means associated with the processing apparatus for withdrawing the portion of the record member between its ends substantially wholly out of the container and into the processing area whereby it can be processed; and h. means for engaging and rotating the reel to wind the record member onto the reel to withdraw it from the processing area.

8. The apparatus of claim 7 wherein the cover is hinged to the box member along one edge thereof; wherein the reel is rotatable within the box member about an axis parallel to said hinged edge; and wherein the means for engaging and rotating the reel to wind the record member onto the reel includes a clutch member drivingly connected to the reel and positioned outside of the box member, and a drive means associated with the processing apparatus and including a second clutch member positioned to engage and rotate the clutch member connected to the reel.

9. A flexible record member holding container for use with a record member processing apparatus, a. a box having an openable cover, b. said box further having record member securing means, c. An elongated flexible record member having two ends, one end secured by said securing means to keep said one end inside the box, the opposite end being secured to the cover, the portion of the member between said ends being storable inside the box and adapted to be removed substantially in its entirety from the box while both ends remain secured to said box.

10. The apparatus of claim 9 wherein said record member is secured to said cover in a manner such that as said cover is opened, the record member starts to leave said box, and means in said box for opening said cover in a manner to pull the record member into a small loop for facilitating further mechanized unloading.

11. The apparatus of claim 9 wherein said cover is pivotally secured to said box transversely to the length of said record member for pivotal opening and closing movement, first means on said cover opposite said pivotal securing and second means on said box disposed for engagement with said first means for releasably securing said cover in a closed position, and said record member being secured to said cover in juxtaposition to said first means for maximizing record member for a given pivotal movement of said cover.

12. The apparatus of claim 9 wherein said record member securing means comprises a reel disposed inside said box, said reel being rotatable within said box for coiling and uncoiling said record member thereabout, and said record member having said one end stationarily secured to said reel for rotation therewith.

13. The apparatus of claim 12 wherein said reel is rotatable about a given axis, said cover being pivotally attached to said box along one wall thereof which is parallel to said given axis, and said opposite end being stationarily secured to said cover along an outer edge thereof opposite said pivotal attachment, and locking means for releasably securing said cover adjacent said outer edge to said box and including means when being released to open the cover a predetermined amount for removing a short length of said record member from said box.

* * * * *

930-4008-00D
PO-1050
(5/69)

UNITED STATES PATENT OFFICE

CERTIFICATE OF CORRECTION

Patent No. 3,627,225 Dated December 14, 1971

Inventor(s) Paul J. Badum and Henry Zeiger

It is certified that error appears in the above-identified patent and that said Letters Patent are hereby corrected as shown below:

In the heading, reference numeral [73], fifth line, "Nov." should read --Jan.--.

Column 8, line 20, after "member" insert --removal--.

Signed and sealed this 25th day of April 1972.

(SEAL)
Attest:

EDWARD M.FLETCHER,JR.
Attesting Officer

ROBERT GOTTSCHALK
Commissioner of Patents